(12) United States Patent
Jahan et al.

(10) Patent No.: US 10,768,269 B2
(45) Date of Patent: Sep. 8, 2020

(54) METHOD FOR LOCATING ELECTROMAGNETIC PULSE EMISSION SOURCES IN AN ENVIRONMENT INCLUDING REFLECTORS

(71) Applicant: THALES, Courbevoie (FR)

(72) Inventors: Daniel Jahan, Brest (FR); Romain Giacometti, Brest (FR); Cédric Cornu, Brest (FR)

(73) Assignee: Thales, Courbevoie (FR)

( * ) Notice: Subject to any disclaimer, the term of this patent is extended or adjusted under 35 U.S.C. 154(b) by 228 days.

(21) Appl. No.: 16/102,611

(22) Filed: Aug. 13, 2018

(65) Prior Publication Data

US 2018/0348336 A1 Dec. 6, 2018

Related U.S. Application Data

(63) Continuation of application No. PCT/EP2017/053567, filed on Feb. 16, 2017.

(30) Foreign Application Priority Data

Feb. 18, 2016 (FR) ..................... 16 00272

(51) Int. Cl.
*G01S 5/12* (2006.01)
*G01S 3/50* (2006.01)
(Continued)

(52) U.S. Cl.
CPC .................. *G01S 5/12* (2013.01); *G01S 3/50* (2013.01); *G01S 5/0273* (2013.01); *G01S 11/02* (2013.01); *G01S 2013/462* (2013.01)

(58) Field of Classification Search
CPC ............. G01S 2013/462; G01S 13/003; G01S 5/0273; G01S 5/12; G01S 3/50; G01S 11/04; G01S 11/06

See application file for complete search history.

(56) References Cited

U.S. PATENT DOCUMENTS

| 2011/0140966 A1 | 6/2011 | Ferreol et al. |
| 2012/0122470 A1* | 5/2012 | Germond .................. G01S 5/12 455/456.1 |
| 2015/0323642 A1 | 11/2015 | Mutz et al. |

FOREIGN PATENT DOCUMENTS

EP 2 428 810 A1 3/2012

OTHER PUBLICATIONS

International Search Report and Written Opinion dated May 11, 2017, received in PCT/EP2017/053567 filed Feb. 16, 2017.
(Continued)

*Primary Examiner* — Bernarr E Gregory
*Assistant Examiner* — Fred H Mull
(74) *Attorney, Agent, or Firm* — Knobbe, Martens, Olson & Bear, LLP

(57) ABSTRACT

Methods for locating electromagnetic pulse emission sources in an environment including reflectors is disclosed. In one aspect, the method includes receiving, by a detector, for each source to be located, at least one same emitted pulse, received directly from said source and received by reflection on one of the reflectors. The method also includes identifying direct subsets and reflected subsets, regrouping by pairs of direct subsets with reflected subsets, calculating, for each pair, differences in dates of arrival between the pulses of the reflected subset and the pulses of the direct subset of the pair, and determining the distance of each source from the detector from calculated differences in dates of arrival of the pulses of each pair.

12 Claims, 3 Drawing Sheets

(51) Int. Cl.
*G01S 5/02* (2010.01)
*G01S 11/02* (2010.01)
*G01S 13/46* (2006.01)

(56) References Cited

OTHER PUBLICATIONS

Preliminary Search Report dated Oct. 19, 2016, received in FR 16 00272 filed Feb. 18, 2016.

* cited by examiner

METHOD FOR LOCATING ELECTROMAGNETIC PULSE EMISSION SOURCES IN AN ENVIRONMENT INCLUDING REFLECTORS

CROSS-REFERENCE TO RELATED APPLICATIONS

This application is a continuation of International Application No. PCT/EP2017/053567, filed Feb. 16, 2017, which claims the benefit under 35 U.S.C. § 119 of French Application No. 16 00272, filed Feb. 18, 2016, each of which is herein incorporated by reference in its entirety.

BACKGROUND

Technological Field

The described technology relates to a method for locating at least two sources emitting electromagnetic pulses in an environment, the environment including at least two reflectors.

Description of the Related Art

The location of a source includes determining the direction and distance of the source relative to a reference point. Such a location is generally based on a multi-offset principle including observing the source from different angles.

To locate a source, one known method, using the principle of triangulation, includes measuring the direction of arrival of the pulses emitted by the source using several detectors, delocalized from one another. Triangulation is a technique making it possible to determine the position of a point by measuring the angles between this point and other reference points whose position is known.

However, such a method requires using a network of detectors, and therefore necessarily a coordination system for the detectors of the network, which, aside from the cost related to the number of detectors, rules out the possibility of working with a single detector.

A location method has also been developed that includes arranging a single detector on a carrier having a relatively high movement speed with respect to the source to be located. Such a relative movement makes it possible to obtain a set of arrival directions over time, the meeting point of which is where the source is located.

However, obtaining a relative movement requires a particularly swift carrier relative to the sources to be located, which makes the method unsuitable in the case of a moving source.

Another known method is based on measuring differences in passage times of antenna beams (DPTAB).

Nevertheless, such measurements assume knowledge of the rotation speed of the antenna beam and therefore the performance of circular sweeping, which involves a relatively slow acquisition.

It is also known to use the time difference of arrival (abbreviated TDOA) of a same signal arriving at two different reception points to locate a source. Such a time difference makes it possible to determine the geometric place where the source is located.

However, here again, at least two detectors are necessary, which rules out the possibility of working with a single detector.

Methods combining TDOA and DPTAB measurements from a single detector are also known.

Conversely, as previously explained, DPTAB measurements require circular sweeping, which is both slow and uncertain.

Methods are also known making it possible to locate pairs of sources in an environment comprising at least said sources and two reflectors. Such methods are based on calculating differences in dates of arrival between the pulses emitted by said sources and received directly on the detector and the pulses emitted by said sources and received on the detector after reflection on one of the reflectors.

SUMMARY OF CERTAIN INVENTIVE ASPECTS

However, the precision of such methods may be further improved.

There is therefore a need for a method allowing the precise location of sources in an environment from a single detector that is quasi-static relative to the sources to be located.

To that end, one inventive aspect of the described technology relates to a location method including the following:

receiving, by a detector, for each source to be located, at least one same emitted pulse, received on the one hand directly from said source and received on the other hand by reflection on one of the reflectors, measuring the arrival direction, the date of arrival, the power and at least one invariant technical characteristic of each received pulse, identifying direct subsets and reflected subsets, each direct subset comprising pulses received directly from a same source to be located, each reflected subset comprising pulses emitted by a same source to be located and received after reflection on a same reflector, grouping by pairs of direct subsets with reflected subsets, the pulses of the subsets of each pair having the same invariant technical characteristics, calculating, for each pair, differences in dates of arrival between the pulses of the reflected subset and the pulses of the direct subset of the pair, determining the distance of each source from the detector from calculated differences in dates of arrival of the pulses of each pair.

The identification includes:

regrouping received pulses with same invariant technical characteristics and same directions of arrival into subsets, determining the maximum power of the pulses of each subset and the number of pulses of each subset, for each subset, when a first condition is met, then the subset comprises pulses received directly, the first condition stipulating that the maximum power determined for said subset is greater than or equal to a first predetermined power threshold and the number of pulses determined for said subset is equal to the maximum number of pulses from among the number of pulses of the subsets with same invariant technical characteristics as said subset irrespective of the direction of arrival of said subsets, for each subset, when a second condition is met, then the pulses of said subset are identified as received reflected, the second condition stipulating that the maximum power determined for said subset is strictly less than a second predetermined power threshold and the number of pulses determined for said subset is strictly less than the maximum number of pulses from among the number of pulses of the subsets with same invariant technical characteristics as said subset irrespective of the direction of arrival of said subsets.

According to specific embodiments, the location method comprises one or more of the following features, considered alone or according to any technically possible combinations:

for each subset, when the first condition is met, the identification further comprises:

establishing a first statistical distribution of the deviations between the successive dates of arrival of the pulses of said subset, having a power greater than or equal to half the maximum power, establishing a second statistical distribution of the deviations between the successive dates of arrival of the pulses of said subset, when the second statistical distribution is identical to the first statistical distribution, then the pulses of said subset are identified as received directly and the subset is a direct subset, when the second statistical distribution comprises deviations different from the deviations of the first statistical distribution and less than or equal to a third predetermined threshold, then the pulses from which said different deviations are derived are identified as being received reflected and form a reflected subset and the remaining pulses of said subset are identified as being received directly and form a direct subset.

the determination comprises, for each direct subset, establishing a map showing all of the differences in date of arrival calculated from pulses of said direct subset, based on directions of arrival of the reflected pulses corresponding to said calculated differences in date of arrival, the distance from each source to the detector being determined based on maps established for each direct subset.

for each pair made up of two direct subsets, the pulses of which have different directions of arrival and different invariant technical characteristics, the determination further comprises identifying, from the maps established for said direct subsets, one or several geometric configurations, each geometric configuration being chosen from among the following configurations:

a first configuration in which said pair of direct subsets corresponds to two sources to be located, the pulses emitted by said sources being reflected on two reflectors, one of the reflectors being combined with one of said sources and the other reflector being combined with the other of said sources, the first configuration being associated with: a first delay relative to the reflection of the pulses emitted by a first of said sources on the reflector combined with the other source and a second delay relative to the reflection of the pulses emitted by a second of said sources on the reflector combined with the other source, a second configuration in which said pair of direct subsets corresponds to two sources to be located, the pulses emitted by said sources being reflected on two reflectors, one of the reflectors being combined with one of said sources and the other of the reflectors being combined with one of said sources, the second configuration being associated with: a first delay relative to the reflection of the pulses emitted by a first of said sources on the reflector combined with the other source, a second delay relative to the reflection of the emitted pulses by the first of said sources on the separate reflector, and a third delay relative to the reflection of the pulses emitted by a second of said sources on the separate reflector, a third configuration in which said pair of direct subsets corresponds to two sources to be located, the pulses emitted by said sources being reflected on two reflectors separate from said sources, the third configuration being associated with: a first delay relative to the reflection of the pulses emitted by a first of said sources on a first of said reflectors, a second delay relative to the reflection of the pulses emitted by a second of said sources on the first of said reflectors, a third delay relative to the reflection of the pulses emitted by the first of said sources on a second of said reflectors, and a fourth delay relative to the reflection of the pulses emitted by the second of said sources on the second of said reflectors, the distance from each source to the detector being determined based on the delays associated with each determined configuration and the directions of arrival of the pulses corresponding to said delays.

each configuration makes it possible to determine the respective distances of two of the sources to be located from the detector, said distances being calculated:

for each first configuration from the following equations:

$$\begin{cases} RE_{i_1} = \dfrac{\Delta_{E_{i_2},S_{n_1}}^2 + 2\Delta_{E_{i_2},S_{n_1}} \cdot RE_{i_2}}{2\Delta_{E_{i_2},S_{n_1}} + 2(1 - \cos(\alpha_{E_{i_2},S_{n_1}})) \cdot RE_{i_2}} \\ RE_{i_2} = \dfrac{\Delta_{E_{i_1},S_{n_2}}^2 + 2\Delta_{E_{i_1},S_{n_2}} \cdot RE_{i_1}}{2\Delta_{E_{i_1},S_{n_2}} + 2(1 - \cos(\alpha_{E_{i_1},S_{n_2}})) \cdot RE_{i_1}} \end{cases}$$

for each second configuration from the following equations:

$$\begin{cases} \dfrac{\Delta_{E_{i_1},S_{n_1}}^2 + 2\Delta_{E_{i_1},S_{n_1}} \cdot RE_{i_1}}{2\Delta_{E_{i_1},S_{n_1}} + 2(1 - \cos(\alpha_{E_{i_1},S_{n_1}})) \cdot RE_{i_1}} = \dfrac{\Delta_{E_{i_2},S_{n_1}}^2 + 2\Delta_{E_{i_2},S_{n_1}} \cdot RE_{i_2}}{2\Delta_{E_{i_2},S_{n_1}} + 2(1 - \cos(\alpha_{E_{i_2},S_{n_1}})) \cdot RE_{i_2}} \\ RE_{i_2} = \dfrac{\Delta_{E_{i_1},S_{n_2}}^2 + 2\Delta_{E_{i_1},S_{n_2}} \cdot RE_{i_1}}{2\Delta_{E_{i_1},S_{n_2}} + 2(1 - \cos(\alpha_{E_{i_1},S_{n_2}})) \cdot RE_{i_1}} \end{cases}$$

or $$\begin{cases} RE_{i_1} = \dfrac{\Delta_{E_{i_2},S_{n_1}}^2 + 2\Delta_{E_{i_2},S_{n_1}} \cdot RE_{i_2}}{2\Delta_{E_{i_2},S_{n_1}} + 2(1 - \cos(\alpha_{E_{i_2},S_{n_1}})) \cdot RE_{i_2}} \\ \dfrac{\Delta_{E_{i_1},S_{n_2}}^2 + 2\Delta_{E_{i_1},S_{n_2}} \cdot RE_{i_1}}{2\Delta_{E_{i_1},S_{n_2}} + 2(1 - \cos(\alpha_{E_{i_1},S_{n_2}})) \cdot RE_{i_1}} = \dfrac{\Delta_{E_{i_2},S_{n_2}}^2 + 2\Delta_{E_{i_2},S_{n_2}} \cdot RE_{i_2}}{2\Delta_{E_{i_2},S_{n_2}} + 2(1 - \cos(\alpha_{E_{i_2},S_{n_2}})) \cdot RE_{i_2}} \end{cases}$$

for each third configuration from the following equations:

$$\begin{cases} \dfrac{\Delta_{E_{i_1},S_{n_2}}^2 + 2\Delta_{E_{i_1},S_{n_2}} \cdot RE_{i_1}}{2\Delta_{E_{i_1},S_{n_2}} + 2(1 - \cos(\alpha_{E_{i_1},S_{n_2}})) \cdot RE_{i_1}} = \dfrac{\Delta_{E_{i_2},S_{n_1}}^2 + 2\Delta_{E_{i_2},S_{n_1}} \cdot RE_{i_2}}{2\Delta_{E_{i_2},S_{n_1}} + 2(1 - \cos(\alpha_{E_{i_2},S_{n_1}})) \cdot RE_{i_2}} \\ \dfrac{\Delta_{E_{i_1},S_{n_2}}^2 + 2\Delta_{E_{i_1},S_{n_2}} \cdot RE_{i_1}}{2\Delta_{E_{i_1},S_{n_2}} + 2(1 - \cos(\alpha_{E_{i_1},S_{n_2}})) \cdot RE_{i_1}} = \dfrac{\Delta_{E_{i_2},S_{n_2}}^2 + 2\Delta_{E_{i_2},S_{n_2}} \cdot RE_{i_2}}{2\Delta_{E_{i_2},S_{n_2}} + 2(1 - \cos(\alpha_{E_{i_2},S_{n_2}})) \cdot RE_{i_2}} \end{cases}$$

Where $\Delta_{E_{i_1},S_{n_1}} = c \cdot \tau_{E_{i1},S_{n1}}, \Delta_{E_{i_2},S_{n_2}} = c \cdot \tau_{E_{i2},S_{n2}},$ $\Delta_{E_{i_2},S_{n_1}} = c \cdot \tau_{E_{i2},S_{n1}}, \Delta_{E_{i_1},S_{n_2}} = c \cdot \tau_{E_{i1},S_{n2}},$ $RE_{i_1}$ is the distance from the first source Ei1 to the detector R, $RE_{i_2}$ is the distance from the second source Ei2 to the detector R, C' is the propagation speed of the electromagnetic waves, $\tau_{E_{i1},S_{n_1}}$ is the difference in date of arrival among the pulses received by reflection on a first reflector relative to the pulses received directly from the first source, $\tau_{E_{i2},S_{n_2}}$ is the difference in date of arrival among the pulses received reflected on a second reflector relative to the pulses received directly from the second source, $\tau_{E_{i2},S_{n_1}}$ is the difference in date of arrival among the pulses received reflected on the first reflector relative to the pulses received directly from the second source, $\tau_{E_{i1},S_{n_2}}$ is the difference in date of arrival among the pulses received reflected on the second reflector relative to the pulses received directly from the first source, $$\alpha_{E_{i_2},S_{n_2}}$$

is the angular deviation between the second source and the second reflector seen from the detector, $$\alpha_{E_{i_1},S_{n_1}}$$

is the angular deviation between the first source and the first reflector seen from the detector, $$\alpha_{E_{i_2},S_{n_1}}$$

is the angular deviation between the second source and the first reflector seen from the detector, and $$\alpha_{E_{i_1},S_{n_2}}$$

is the angular deviation between the second source and the first reflector seen from the detector.

the configuration(s) identified for each pair of direct subsets make it possible to obtain at least one distance from each source to the detector, the distance determined for each source being the most frequently occurring distance from among the distance value(s) obtained for said source.

the configuration(s) identified for each pair of direct subsets also it possible to obtain at least one distance from each reflector to the detector.

the calculating differences in date of arrival for each pair comprises eliminating differences in date of arrival strictly above a fourth predetermined threshold and for which the number of occurrences is greater than or equal to a fifth predetermined threshold.

the invariant characteristics of each pulse comprise at least one of the features from among: the width of the pulse, the carrier frequency of the pulse and the intentional intra-pulse modulation.

Another aspect of the described technology also relates to a location device for at least two electromagnetic pulse emission sources in an environment, the environment comprising at least two reflectors, the detector being able to carry out the method as defined above.

BRIEF DESCRIPTION OF THE DRAWINGS

Other features and advantages of the described technology will appear upon reading the following description of embodiments of the described technology, solely as an example and done in reference to the drawings, which are.

DETAILED DESCRIPTION OF CERTAIN INVENTIVE EMBODIMENTS

One general principle for implementing the described technology is described hereinafter, based on FIG. 1.

Figure 1:
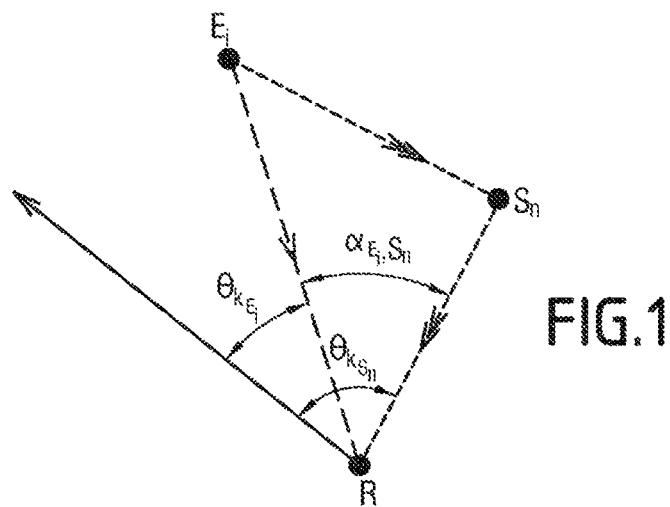
FIG. 1, a schematic view of one example of a source to be located, a reflector and a detector configured to locate the source, FIG. 2, a schematic view of an example of a first configuration of two sources to be located and two reflectors, each source being co-located with a reflector, FIG. 3, a schematic view of an example of a second configuration of two sources to be located and two reflectors, one of the sources being co-located with a reflector, FIG. 4, a schematic view of another example of a second configuration of two sources to be located and two reflectors, FIG. 5, a schematic view of an example of a third configuration of two sources to be located and two reflectors, the sources not being co-located with the reflectors, FIG. 6, a schematic and functional view of the detector of FIG. 1, FIG. 7, a flowchart of one example implementation of a method for locating sources, FIG. 8, a map showing the differences in date of arrival obtained for a same source, based on directions of arrival of the corresponding reflected pulses, and FIG. 9, a superposition of maps obtained for two different sources.

FIG. 1 illustrates an emission source $E_i$, a reflector $S_n$, and a detector R, forming the three points of a bistatic triangle $E_iRS_n$.

Each emission source $E_i$ is for example a radar emission source, i.e., a modulated electromagnetic emission source, and more particularly pulse-modulated, preferably pulse amplitude modulated. Such pulse amplitude modulation indeed allows a simplified measurement of the date of the rising edge or the date of arrival of the pulse relative to other types of modulation.

Each source $E_i$ is for example arranged at sea on ships delocalized from one another.

One aim of the described technology is to locate said sources $E_i$ using a single radar detector R placed at a distance from the sources $E_i$, as illustrated by FIG. 1.

The radar detector R receives the signal $I_{E_i}$ corresponding to the pulse emitted by the source $E_i$ directly, i.e., after having traveled the path $E_iR$. This signal is characterized by characteristics $$a_{i_{E_i}},$$

a date of arrival $t_{E_i}$ and a direction of arrival $$\theta_{k_{E_i}}$$

measured by the detector R.

The radar detector R also receives the signal $I_{E_i,S_n}$ corresponding to the same pulse emitted by the source $E_i$ and reflected on the reflector $S_n$, i.e., after having traveled the path $E_iS_n+S_nR$. This signal is characterized by characteristics $a_{E_i,S_n}$, a date of arrival $t_{E_i,S_n}$ and a direction of arrival $\theta_{k_{S_n}}$ measured by the detector R.

Thus, for the source $E_i$ and the reflector $S_n$, the detector R receives the two signals:

$$I_{E_i}(a_{E_i}, \theta_{k_{E_i}}, t_{E_i}) \text{ and } I_{E_i,S_n}(a_{E_i,S_n}, \theta_{k_{S_n}}, t_{E_i,S_n}).$$

From the signals $$I_{E_i}(a_{E_i}, \theta_{k_{E_i}}, t_{E_i}) \text{ and } I_{E_i,S_n}(a_{E_i,S_n}, \theta_{k_{S_n}}, t_{E_i,S_n}),$$

the detector R deduces the difference in time of arrival $\tau_{E_i,S_n}$ and the difference in direction of arrival $\alpha_{E_i,S_n}$ between the pulse received directly and the pulse received by reflection from a same emission, or therefore:

$$\tau_{E_i,S_n} = t_{E_i,S_n} - t_{E_i} \qquad (1)$$

$$\alpha_{E_i,S_n} = \theta_{k_{E_i}} - \theta_{k_{S_n}} \qquad (2)$$

The difference in paths $E_i S_n + RS_n - RE_i = c\tau_{E_i,S_n}$ is called the associated bistatic distance and is denoted $\Delta_{E_i,S_n}$, or:

$$\Delta_{E_i,S_n} = c\tau_{E_i,S_n} \qquad (3)$$

Such an expression makes it possible to obtain the following expression of the distance $E_i S_n$ between the source $E_i$ and the reflector $S_n$:

$$E_i S_n = \Delta_{E_i,S_n} + RE_i - RS_n \qquad (4)$$

The application of the cosine theorem to the triangle $E_i R S_n$ makes it possible to write the following equation:

$$E_i S_n^2 = RS_k^2 + RE_i^2 - 2RE_i \cdot RS_n \cdot \cos(\alpha E_i, S_n) \qquad (5)$$

By eliminating the term $E_i S_n$ from expressions (4) and (5), the following expression of the distance $RS_n$ between the reflector $S_n$ and the detector R is obtained:

$$RS_n = \frac{\Delta_{E_i,S_n}^2 + 2\Delta_{E_i,S_n} \cdot RE_i}{2\Delta_{E_i,S_n} + 2RE_i \cdot (1 - \cos(\alpha_{E_i,S_n}))} \qquad (6)$$

If a single detector R is used, the resolution of the localization problem from direction of arrival and time of arrival measurements is based on the fact that the studied zone includes at least two sources $E_i$ not colocalized with one another, $E_{i1}$ and $E_{i2}$, and two reflectors $S_n$ also not colocalized with one another, $S_{n1}$ and $S_{n2}$. One or several colocalizations of a source $E_i$ with a reflector $S_n$ are, however, acceptable. Two elements are considered "colocalized" when the positions of each element are identical or quasi-combined in light of measuring precisions.

From two sources and two reflectors, there are therefore four possible configurations. These configurations are illustrated by FIGS. 2 to 5.

Figure 2:
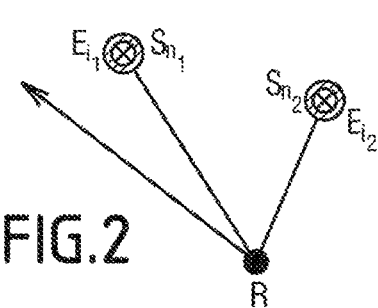

In particular, FIG. 2 illustrates a first configuration in which the two sources are not colocalized with one another or aligned with the detector R, and each source is colocalized with a reflector. The first configuration of FIG. 2 comprises two non-degenerated bistatic triangles $E_{i1}RS_{n2}$ and $E_{i2}RS_{n1}$ and two degenerated bistatic triangles $E_{i1}RS_{n1}$ and $E_{i2}RS_{n2}$. A triangle is said to be degenerated when it can be summarized by one segment.

Figure 3:
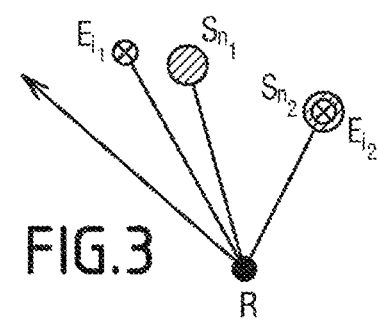
Figure 4:
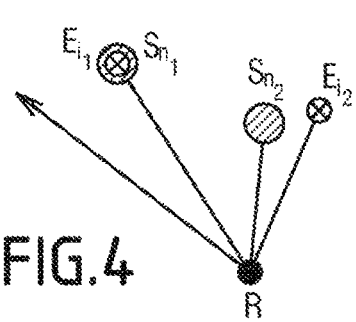

FIGS. 3 and 4 each illustrate a second configuration in which the two sources are not colocalized with one another or aligned with the detector R, and a single source is colocalized with a reflector, the other source and the other reflector not being colocalized or aligned with the detector R. The second configuration of FIG. 3 comprises three non-degenerated bistatic triangles $E_{i1}RS_{n1}$, $E_{i1}RS_{n2}$ and $E_{i2}RS_{n1}$ and one degenerated bistatic triangle $E_{i2}RS_{n2}$. The second configuration of FIG. 4 comprises three non-degenerated bistatic triangles $E_{i2}RS_{n2}$, $E_{i1}RS_{n2}$ and $E_{i2}RS_{n1}$ and one degenerated bistatic triangle $E_{i1}RS_{n1}$.

Figure 5:
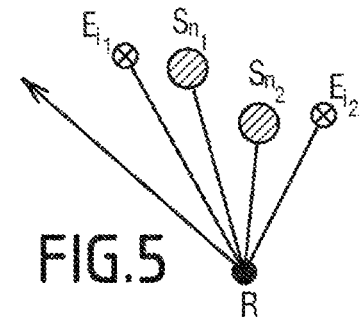

FIG. 5 illustrates a third configuration in which the sources and the reflectors are not colocalized with one another, or aligned with the detector R. The third configuration of FIG. 5 comprises four non-degenerated bistatic triangles $E_{i1}RS_{n1}$, $E_{i2}RS_{n2}$, $E_{i1}RS_{n2}$ and $E_{i2}RS_{n1}$.

The application of relationship (6) to each possible bistatic triangle provides four expressions:

$$\text{Triangle } E_{i1}RS_{n1} \Rightarrow RS_{n_1} = \frac{\Delta_{E_{i_1},S_{n_1}}^2 + 2\Delta_{E_{i_1},S_{n_1}} \cdot RE_{i_1}}{2\Delta_{E_{i_1},S_{n_1}} + 2(1 - \cos(\alpha_{E_{i_1},S_{n_1}})) \cdot RE_{i_1}} \qquad (7.1)$$

$$\text{Triangle } E_{i1}RS_{n2} \Rightarrow RS_{n_2} = \frac{\Delta_{E_{i_1},S_{n_2}}^2 + 2\Delta_{E_{i_1},S_{n_2}} \cdot RE_{i_1}}{2\Delta_{E_{i_1},S_{n_2}} + 2(1 - \cos(\alpha_{E_{i_1},S_{n_2}})) \cdot RE_{i_1}} \qquad (7.2)$$

$$\text{Triangle } E_{i2}RS_{n1} \Rightarrow RS_{n_1} = \frac{\Delta_{E_{i_2},S_{n_1}}^2 + 2\Delta_{E_{i_2},S_{n_1}} \cdot RE_{i_2}}{2\Delta_{E_{i_2},S_{n_1}} + 2(1 - \cos(\alpha_{E_{i_2},S_{n_1}})) \cdot RE_{i_2}} \qquad (7.3)$$

$$\text{Triangle } E_{i2}RS_{n2} \Rightarrow RS_{n_2} = \frac{\Delta_{E_{i_2},S_{n_2}}^2 + 2\Delta_{E_{i_2},S_{n_2}} \cdot RE_{i_2}}{2\Delta_{E_{i_2},S_{n_2}} + 2(1 - \cos(\alpha_{E_{i_2},S_{n_2}})) \cdot RE_{i_2}} \qquad (7.4)$$

Expressions (7.1) to (7.4) only have a complete meaning for the third configuration. Indeed, the expressions relative to the degenerated bistatic triangles are meaningless due to the nil values corresponding to the measurements of the bistatic distance $\Delta_{E_i,S_n}$ and the difference in angle of arrival $\alpha_{E_i,S_n}$ between the source and the reflector.

In the case of the third configuration of FIG. 5, the equality of expressions (7.1) and (7.3) and that of expressions (7.2) and (7.4), makes it possible to obtain the following equations:

$$RS_{n_1} = \frac{\Delta_{E_{i_1},S_{n_1}}^2 + 2\Delta_{E_{i_1},S_{n_1}} \cdot RE_{i_1}}{2\Delta_{E_{i_1},S_{n_1}} + 2(1 - \cos(\alpha_{E_{i_1},S_{n_1}})) \cdot RE_{i_1}} = \frac{\Delta_{E_{i_2},S_{n_1}}^2 + 2\Delta_{E_{i_2},S_{n_1}} \cdot RE_{i_2}}{2\Delta_{E_{i_2},S_{n_1}} + 2(1 - \cos(\alpha_{E_{i_2},S_{n_1}})) \cdot RE_{i_2}} \qquad (8.1)$$

and

-continued $$RS_{n_2} = \frac{\Delta_{E_{i_1},s_{n_2}^2} + 2\Delta_{E_{i_1},s_{n_2}} \cdot RE_{i_1}}{2\Delta_{E_{i_1},s_{n_2}} + 2(1 - \cos(\alpha_{E_{i_1},s_{n_2}})) \cdot RE_{i_1}} = \frac{\Delta_{E_{i_2},s_{n_2}^2} + 2\Delta_{E_{i_2},s_{n_2}} \cdot RE_{i_2}}{2\Delta_{E_{i_2},s_{n_2}} + 2(1 - \cos(\alpha_{E_{i_2},s_{n_2}})) \cdot RE_{i_2}} \quad (8.2)$$

Where $$\Delta_{E_{i_1},s_{n_1}} = c \cdot \tau_{E_{i_1},S_{n_1}}, \Delta_{E_{i_2},s_{n_2}} = c \cdot \tau_{E_{i_2},S_{n_2}},$$
$$\Delta_{E_{i_2},s_{n_1}} = c \cdot \tau_{E_{i_2},S_{n_1}}, \Delta_{E_{i_1},s_{n_2}} = c \cdot \tau_{E_{i_1},S_{n_2}},$$

$RE_{i_1}$ is the distance from the first source Ei1 to the detector R, $RE_{i_2}$ is the distance from the second source Ei2 to the detector R, c is the propagation speed of the electromagnetic waves, $\tau_{E_{i_1},S_{n_1}}$ is the difference in date of arrival among the pulses received by reflection on a first reflector relative to the pulses received directly from the first source, $\tau_{E_{i_2},S_{n_2}}$ is the difference in date of arrival among the pulses received reflected on a second reflector relative to the pulses received directly from the second source, $\tau_{E_{i_2},S_{n_1}}$ is the difference in date of arrival among the pulses received reflected on the first reflector relative to the pulses received directly from the second source, $\tau_{E_{i_1},S_{n_2}}$ is the difference in date of arrival among the pulses received reflected on the second reflector relative to the pulses received directly from the first source, $\alpha_{E_{i_2},s_{n_2}}$ is the angular deviation between the second source and the second reflector seen from the detector, $\alpha_{E_{i_1},s_{n_1}}$ is the angular deviation between the first source and the first reflector seen from the detector, $\alpha_{E_{i_2},s_{n_1}}$ is the angular deviation between the second source and the first reflector seen from the detector, and $\alpha_{E_{i_1},s_{n_2}}$ is the angular deviation between the second source and the first reflector seen from the detector.

Expressions (8.1) and (8.2) make it possible to obtain a system of two equations of the following type:

$$\begin{cases} b_{11} + b_{12} \cdot RE_{i_1} + b_{13} \cdot RE_{i_2} + b_{14} \cdot RE_{i_1} \cdot RE_{i_2} = 0 \\ b_{21} + b_{22} \cdot RE_{i_1} + b_{23} \cdot RE_{i_2} + b_{24} \cdot RE_{i_1} \cdot RE_{i_2} = 0 \end{cases} \quad (9)$$

In the case of the second configuration of FIG. 3, the preceding expression (8.1) is still valid, but not expression (8.2), since expression (7.4) is meaningless. However, one may note that expression (7.2) is then that of $RE_{i_2}$, which makes it possible to write:

$$RE_{i_2} = RS_{n_2} = \frac{\Delta_{E_{i_1},s_{n_2}^2} + 2\Delta_{E_{i_1},s_{n_2}} \cdot RE_{i_1}}{2\Delta_{E_{i_1},s_{n_2}} + 2(1 - \cos(\alpha_{E_{i_1},s_{n_2}})) \cdot RE_{i_1}} \quad (10)$$

Expressions (8.1) and (10) then make it possible to find system of equations (9).

By symmetry, the second configuration of FIG. 4 arrives at the same system of equations (9).

In the case of the first configuration of FIG. 2, expressions (8.1) and (8.2) are not valid because expressions (7.1) and (7.4) are meaningless. However, one may note that expression (10) is applicable and that expression (7.3) is then that of $RE_{i_1}$, which makes it possible to write:

$$RE_{i_1} = RS_{n_1} = \frac{\Delta_{E_{i_2},s_{n_1}^2} + 2\Delta_{E_{i_2},s_{n_1}} \cdot RE_{i_2}}{2\Delta_{E_{i_2},s_{n_1}} + 2(1 - \cos(\alpha_{E_{i_2},s_{n_1}})) \cdot RE_{i_2}} \quad (11)$$

Expressions (10) and (11) then make it possible to find system of equations (9) again.

A single system of equations (9) therefore makes it possible to extract the unknowns $RE_{i_1}$, $RE_{i_2}$, $RS_{n_1}$, and $RS_{n_2}$, only the coefficients $b_{pq}$ being different from one configuration to the other.

A single processing operation to solve system of equations (9) is therefore carried out by the detector R with coefficients $b_{pq}$ depending on configurations found upon the detection.

The coefficients $b_{pq}$ of system (9) are expressed below as a function of the different configurations:

For the first configuration illustrated in FIG. 2:

$$\begin{cases} b_{11} = \Delta_{E_{i_2},s_{n_1}^2} \\ b_{12} = -2\Delta_{E_{i_2},s_{n_1}} \\ b_{13} = 2\Delta_{E_{i_2},s_{n_1}} \\ b_{14} = -2(1 - \cos(\alpha_{E_{i_2},s_{n_1}})) \end{cases} \quad (12.1)$$

and $$\begin{cases} b_{21} = -\Delta_{E_{i_1},s_{n_2}^2} \\ b_{22} = -2\Delta_{E_{i_1},s_{n_2}} \\ b_{23} = 2\Delta_{E_{i_2},s_{n_2}} \\ b_{24} = 2(1 - \cos(\alpha_{E_{i_1},s_{n_2}})) \end{cases} \quad (12.2)$$

For the second configuration illustrated in FIG. 3:

$$\begin{cases} b_{11} = 2\Delta_{E_{i_1},s_{n_1}} \Delta_{E_{i_2},s_{n_1}} (\Delta_{E_{i_1},s_{n_1}} - \Delta_{E_{i_2},s_{n_1}}) \\ b_{12} = 2\Delta_{E_{i_2},s_{n_1}} (2\Delta_{E_{i_1},s_{n_1}} - \Delta_{E_{i_2},s_{n_1}} (1 - \cos(\alpha_{E_{i_1},s_{n_1}}))) \\ b_{13} = 2\Delta_{E_{i_2},s_{n_1}} (-2\Delta_{E_{i_2},s_{n_1}} + \Delta_{E_{i_1},s_{n_1}} (1 - \cos(\alpha_{E_{i_2},s_{n_1}}))) \\ b_{14} = 4\Delta_{E_{i_1},s_{n_1}} (1 - \cos(\alpha_{E_{i_2},s_{n_1}})) - 4\Delta_{E_{i_2},s_{n_1}} (1 - \cos(\alpha_{E_{i_2},s_{n_1}})) \end{cases} \quad (12.3)$$

-continued and $$\begin{cases} b_{21} = -\Delta_{E_{i_1},S_{n_2}^2} \\ b_{22} = -2\Delta_{E_{i_1},S_{n_2}} \\ b_{23} = 2\Delta_{E_{i_1},S_{n_2}} \\ b_{24} = 2(1 - \cos(\alpha_{E_{i_1},S_{n_2}})) \end{cases} \quad (12.2)$$

For the second configuration illustrated in FIG. 4:

$$\begin{cases} b_{11} = \Delta_{E_{i_2},S_{n_1}^2} \\ b_{12} = -2\Delta_{E_{i_2},S_{n_1}} \\ b_{13} = 2\Delta_{E_{i_2},S_{n_1}} \\ b_{14} = -2(1 - \cos(\alpha_{E_{i_2},S_{n_1}})) \end{cases} \quad (12.1)$$

and $$\begin{cases} b_{21} = 2\Delta_{E_{i_1},S_{n_2}}\Delta_{E_{i_2},S_{n_2}}(\Delta_{E_{i_1},S_{n_2}} - \Delta_{E_{i_2},S_{n_2}}) \\ b_{22} = 2\Delta_{E_{i_2},S_{n_2}}(2\Delta_{E_{i_2},S_{n_2}} - \Delta_{E_{i_2},S_{n_2}}(1 - \cos(\alpha_{E_{i_1},S_{n_2}}))) \\ b_{23} = 2\Delta_{E_{i_1},S_{n_2}}(-2\Delta_{E_{i_2},S_{n_2}} + \Delta_{E_{i_1},S_{n_2}}(1 - \cos(\alpha_{E_{i_2},S_{n_2}}))) \\ b_{24} = 4\Delta_{E_{i_1},S_{n_2}}(1 - \cos(\alpha_{E_{i_2},S_{n_2}})) - 4\Delta_{E_{i_2},S_{n_2}}(1 - \cos(\alpha_{E_{i_1},S_{n_2}})) \end{cases} \quad (12.4)$$

For the third configuration illustrated in FIG. 5:

$$\begin{cases} b_{11} = 2\Delta_{E_{i_1},S_{n_1}}\Delta_{E_{i_2},S_{n_1}}(\Delta_{E_{i_1},S_{n_1}} - \Delta_{E_{i_2},S_{n_1}}) \\ b_{12} = 2\Delta_{E_{i_2},S_{n_1}}(2\Delta_{E_{i_2},S_{n_1}} - \Delta_{E_{i_2},S_{n_1}}(1 - \cos(\alpha_{E_{i_1},S_{n_1}}))) \\ b_{13} = 2\Delta_{E_{i_1},S_{n_1}}(-2\Delta_{E_{i_2},S_{n_1}} + \Delta_{E_{i_1},S_{n_1}}(1 - \cos(\alpha_{E_{i_2},S_{n_1}}))) \\ b_{14} = 4\Delta_{E_{i_1},S_{n_1}}(1 - \cos(\alpha_{E_{i_2},S_{n_1}})) - 4\Delta_{E_{i_2},S_{n_1}}(1 - \cos(\alpha_{E_{i_1},S_{n_1}})) \end{cases} \quad (12.3)$$

and $$\begin{cases} b_{21} = 2\Delta_{E_{i_1},S_{n_2}}\Delta_{E_{i_2},S_{n_2}}(\Delta_{E_{i_1},S_{n_2}} - \Delta_{E_{i_2},S_{n_2}}) \\ b_{22} = 2\Delta_{E_{i_2},S_{n_2}}(2\Delta_{E_{i_1},S_{n_2}} - \Delta_{E_{i_2},S_{n_2}}(1 - \cos(\alpha_{E_{i_1},S_{n_2}}))) \\ b_{23} = 2\Delta_{E_{i_1},S_{n_2}}(-2\Delta_{E_{i_2},S_{n_2}} + \Delta_{E_{i_1},S_{n_2}}(1 - \cos(\alpha_{E_{i_2},S_{n_2}}))) \\ b_{24} = 4\Delta_{E_{i_1},S_{n_2}}(1 - \cos(\alpha_{E_{i_2},S_{n_2}})) - 4\Delta_{E_{i_2},S_{n_2}}(1 - \cos(\alpha_{E_{i_1},S_{n_2}})) \end{cases} \quad (12.4)$$

From the first equation of system (9), it is for example possible to express, $RE_{i_1}$ as a function of $RE_{i_2}$:

$$RE_{i_1} = \frac{b_{11} + b_{13} \cdot RE_{i_2}}{b_{12} + b_{14} \cdot RE_{i_2}} \quad (13)$$

Expression (13) introduced into the second equation of system (9) results in a second-degree equation in $RE_{i2}$, solved by the detector R:

$$A \cdot RE_{i_2}^2 + B \cdot RE_{i_2} + C = 0 \quad (14.1)$$

Where:

$A = b_{13} \cdot b_{24} - b_{14} \cdot b_{23}$, $B = b_{11} \cdot b_{24} - b_{12} \cdot b_{23} + b_{13} \cdot b_{22} - b_{14} \cdot b_{21}$, and $C = b_{11} \cdot b_{22} - b_{12} \cdot b_{21}$.

The solution of equation (14.1) is the only positive square root, or:

$$RE_{i_2} = \frac{-B \pm \sqrt{B^2 - 4AC}}{2A} > 0 \quad (15)$$

The distance $RE_{i_1}$ from the first source to the detector R is calculated by the detector R from expression (13) and the value of $RE_{i_2}$ previously found.

Relationships (7.2) and (7.3) make it possible to calculate the distances from each reflector to the detector $RS_{n_1}$ and $RS_{n_2}$ for measured values of $\Delta_{E_i,S_{ni}}$ and $\alpha_{E_i,S_n}$, and from calculated values of $RE_{i_1}$ and $RE_{i_2}$.

Thus, the sources $E_{i_1}$ and $E_{i_2}$ and the reflectors $S_{n_1}$ and $S_{n_2}$ have indeed been located in polar coordinates, respectively $$(RE_{i_1}, \Theta_{k_{E_{i_1}}}), (RE_{i_2}, \Theta_{k_{E_{i_2}}}), (RS_{n_1}, \Theta_{k_{S_{n_1}}}) \text{ and } (RS_{n_2}, \Theta_{k_{S_{n_2}}}).$$

Figure 6:
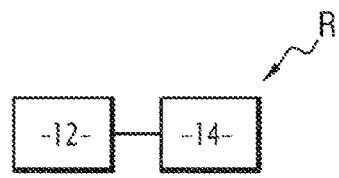

The detector R for locating sources $E_i$ emitting electromagnetic pulses, working on the principle previously described, is functionally illustrated by FIG. 6.

The detector R is a radar detector.

The detector R is quasi-static relative to the sources $E_i$ to be located, i.e., the detector R has, at most, a relatively low speed relative to the sources $E_i$ to be located, such that the geometric evolutions, relative to the bistatic triangles $E_{i1}RS_{n1}$, $E_{i2}RS_{n2}$, $E_{i1}RS_{n2}$ and $E_{i2}RS_{n1}$ are inferior enough to the desired precision not to affect it.

The detector R comprises a receiving module 12 and a computer 14.

The receiving module 12 comprises an array of goniometry antennas forming a single detector considered to be periodic, a set of reception chains associated with the antenna array and processing functions making it possible to measure characteristics of the received pulses.

The characteristics of the pulses measured by the receiving module 12 are for example the direction of arrival of the pulses, the carrier frequency of the pulses, the width of the pulses, the date of arrival of the pulses, the intentional modulation on pulse, or the power of the pulses.

The computer 14 interacts with the receiving module 12.

The computer 14 for example comprises a processor, a memory and a data processing unit. The data processing unit is configured to carry out, in interaction with a computer program product, able to be loaded in the data processing unit, a location method that will be described in more detail in the rest of the description.

Figure 7:
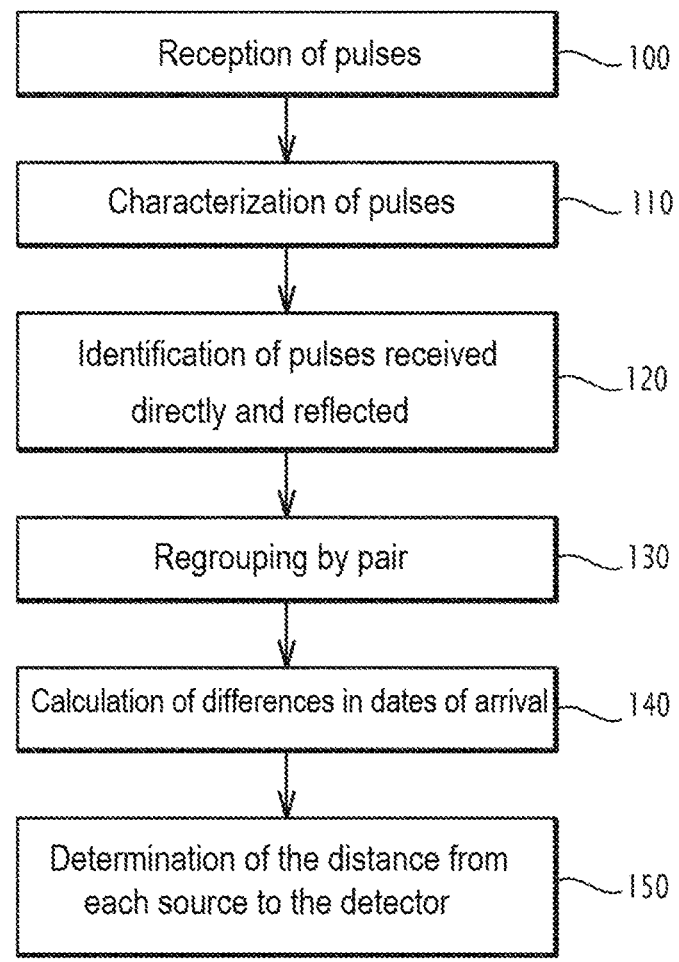

An example of operation of the detector R is now described in reference to FIG. 7, which schematically shows a flowchart of the implementation of a method for locating sources $E_1, \ldots, E_n$ emitting electromagnetic pulses.

In the rest of the description, the term "equal" means "equal to within an allowance". The selected allowance is related to the measuring precisions, the measuring signal-to-noise ratio and the frequency of the signals received on the detector R. The chosen allowance is for example ±5 percent (%).

For each source $E_i$ to be located, the determination method initially comprises a step 100 for reception by the detector R of at least one emitted pulse, on the one hand received directly, i.e., along the path going directly from the source $E_i$ to the detector R, and on the other hand received in its reflected form, i.e., after reflection on a reflector $S_n$.

Only the difference in geometric paths, which causes different dates of arrival, and the quality of the reflection make it possible to differentiate the pulse received directly from the pulse received reflected when these received pulses come from the same emission.

Next, the location method comprises a step 110 for measuring, by the detector R, the direction of arrival $\theta$, the date of arrival t on the detector R, the power p and at least one invariant technical characteristic CTI of each received pulse.

The invariant characteristics CTI of each pulse comprise at least one of the features from among: the width of the pulse, the carrier frequency of the pulse and the intentional intra-pulse modulation.

In the continuation of the description, a received pulse whose characteristics have been measured by the detector R is denoted I(CTI, $\theta$, t, p).

The following steps of the method are carried out for different successive periods of time T. The value of each period of time T is for example approximately at least one antenna rotation period of the radar sources of interest. Such a time period value T in fact makes it possible for the radar sources of interest to have illuminated the reflectors.

Reference {I(CTI, $\theta$, t, p)} denotes the set of pulses received by the detector R and the characteristics of which have been measured by the detector R over a given time period T. In each set {I(CTI, $\theta$, t, p)}, the pulses coming from a same source $E_i$ are mixed over time with the pulses coming from other sources $E_i$.

The method comprises a step 120 for identification, for each set {I(CTI, $\theta$, t, p)}, of the pulses received directly and the pulses received by reflection.

The identification step 120 comprises, for each set {I(CTI, $\theta$, t, p)}, regrouping received pulses with same invariant technical characteristics CTI and same directions of arrival $\theta$ into subsets. Such subsets are said to be coherent in invariant technical characteristics CTI and in directions of arrival $\theta$, and are denoted {I(CTI$_j$, $\Theta_k$, t, p)}.

The identification step 120 next comprises determining the maximum power $P_{max}$(CTI$_j$, $\Theta_k$) of the pulses of each subset {I(CTI$_j$, $\Theta_k$, t, p)} and the number of pulses NI(CTI$_j$, $\Theta_k$) of each subset {I(CTI$_j$, $\Theta_k$, t, p)}.

For each subset {I(CTI$_j$, $\Theta_k$, t, p)}, when a first condition is met, then the subset {I(CTI$_j$, $\Theta_k$, t, p)} comprises pulses received directly.

The first condition stipulates that the maximum power $P_{max}$(CTI$_j$, $\Theta_k$) determined for said subset {I(CTI$_j$, $\Theta_k$, t, p)} is greater than or equal to a first predetermined power threshold $P_1$. The first predetermined power threshold $P_1$ is for example chosen based on the radiated power of the sources $E_i$. The radiated power of a source (abbreviated EIRP) is the product of the power injected in the antenna(s) of the source by the gain of said antenna(s) of the source.

The first condition stipulates the number of pulses NI(CTI$_j$, $\Theta_k$) determined for said subset {I(CTI$_j$, $\Theta_k$, t, p)} is equal to the maximum number of pulses from among the number of pulses NI(CTI$_j$, $\Theta_k$) of the subsets {I(CTI$_j$, $\Theta_k$, t, p)}$_k$ with same invariant technical characteristics CTI$_j$ as said subset {I(CTI$_j$, $\Theta_k$, t, p)} irrespective of the direction of arrival $\Theta_k$ of said subsets ({I(CTI$_j$, $\Theta_k$, t, p)}$_k$).

When the first condition is met, the considered subset can contain, aside from pulses received directly, reflected pulses, for example, emitted from the considered source and received after reflection on one or several reflectors aligned and located behind the considered source. To identify any such reflected pulses, the identification step 120 comprises the following additional sub-steps in the case where the first condition is met.

If the first condition is met, the identification step 120 comprises establishing a first statistical distribution of the deviations between the successive dates of arrival of the pulses of said subset, having a power greater than or equal to half the maximum power, i.e., pulses of the reduced subset $$\left\{I\left(CTI_j, \Theta_k, t, p \geq \frac{P_{max}(CTI_j, \Theta_k)}{2}\right)\right\}.$$

Such a statistical distribution is for example a histogram of the deviations between the successive dates of arrival of the pulses of said reduced subset $$\left\{I\left(CTI_j, \Theta_k, t, p \geq \frac{P_{max}(CTI_j, \Theta_k)}{2}\right)\right\}.$$

If the first condition is met, the identification step 120 also comprises establishing a second statistical distribution of the deviations between the successive dates of arrival of the pulses of said subset {I(CTI$_j$, $\Theta_k$, t, p)}. Such a statistical distribution is for example a histogram of the deviations between successive dates of arrival of the pulses of the subset {I(CTI$_j$, $\Theta_k$, t, p)}.

When the second statistical distribution is identical to the first statistical distribution, then the pulses of said subset {I(CTI$_j$, $\Theta_k$, t, p)} are identified as received directly and the subset is a direct subset {I(CTI$_j$, $\Theta_k$, t, p)}$_E$.

When the second statistical distribution comprises deviations different from the deviations of the first statistical distribution and less than or equal to a third predetermined threshold, then the pulses from which said different deviations are derived are identified as being received reflected and form a reflected subset {I(CTI$_j$, $\Theta_{k_S}$, t, p)}$_S$. The third predetermined threshold $\tau_s$ is preferably chosen to be less than or equal to 200 microseconds, advantageously less than or equal to 100 microseconds ($\mu$s).

The pulses resulting from said second subset {I(CTI$_j$, $\Theta_k$, t, p)} are identified as being received directly and form a direct subset {I(CTI$_j$, $\Theta_{k_E}$, t, p)}$_E$.

Thus, when the first condition is met for a subset {I(CTI$_j$, $\Theta_k$, t, p)}, the additional sub-steps of the identification step 120 make it possible to determine any reflected pulses of the subset {I(CTI$_j$, $\Theta_k$, t, p)}. Such additional sub-steps are based on the hypothesis that the subset reduced to the subset of pulses with a power greater than or equal to half the maximum power a priori contains only pulses received directly. As a result, the statistical distribution of the deviations between successive dates of arrival contained in such a reduced subassembly causes the pulse repetition intervals (PRI) to emerge. When the considered non-reduced subset comprises reflected received pulses, such reflected received pulses a priori have a small delay relative to the expected pulse repetition intervals. The first and second statistical distributions then make it possible to extract such received reflected pulses from the considered subset.

For each subset {I(CTI$_j$, $\Theta_k$, t, p)}, when a second condition is met, then the pulses of said subset {I(CTI$_j$, $\Theta_k$, t, p)} are identified as being received reflected and the subset is a reflected subset {I(CTI$_j$, $\Theta_{k_S}$, t, p)}$_S$.

The second condition stipulates that the maximum power $P_{max}(CTI_j, \Theta_k)$ determined for said subset $\{I(CTI_j, \Theta_k, t, p)\}$ is strictly less than a second predetermined power threshold $P_2$. The second predetermined power threshold $P_2$ is less than or equal to the first predetermined power threshold $P_1$. The second predetermined power threshold $P_2$ is for example chosen based on the radiated power of the sources $E_i$ and equivalent radar surfaces of the reflectors $S_n$.

The second condition stipulates the number of pulses $(NI(CTI_j, \Theta_k))$ determined for said subset $\{I(CTI_j, \Theta_k, t, p)\}$ is strictly less than the maximum number of pulses from among the number of pulses $NI(CTI_j, \Theta_k)$ of the subsets $\{I(CTI_j, \Theta_k, t, p)\}_k$ with same invariant technical characteristics $CTI_j$ as said subset $\{I(CTI_j, \Theta_k, t, p)\}$ irrespective of the direction of arrival $B_k$ of said subsets $(\{I(CTI_j, \Theta_k, t, p)\}_k)$.

The location method comprises a step 130 for grouping by pairs of direct subsets $\{I(CTI_j, \Theta_{k_E}, t, p)\}_E$ with reflected subsets $\{I(CTI_j, \Theta_{k_S}, t, p)\}_S$, the pulses of the subsets of each pair having the same invariant technical characteristics CTI. The pulses of the reflected subset $\{I(CTI_j, \Theta_{k_S}, t, p)\}_S$ of the pair have a different or identical direction of arrival $\theta$, in the case of reflectors aligned with the source and the detector, from those of the direct subset $\{I(CTI_j, \Theta_{k_E}, t, p)\}_E$ of the pair.

The location method also comprises a step 140 for calculating, for each pair, differences $\tau$ in dates of arrival between the pulses of the reflected subset $\{I(CTI_j, \Theta_{k_S}, t, p)\}_S$ and the pulses of the direct subset $\{I(CTI_j, \Theta_{k_E}, t, p)\}_E$ of the pair.

The calculating step 140 preferably comprises, for each pair, eliminating differences $\tau$ in date of arrival strictly above a fourth predetermined threshold and for which the number of occurrences is greater than or equal to a fifth predetermined threshold. The fourth predetermined threshold is advantageously equal to the third predetermined threshold $\tau_s$. Such an elimination is for example done from a statistical distribution in the form of a histogram of differences $\tau$ in date of arrival calculated for each pair.

The location method further comprises a step 150 for determining the distance $d_i$ of each source from $E_i$ the detector R from calculated differences $\tau$ in calculated dates of arrival and directions of arrival $\theta$ of the pulses of each pair.

To that end, the determination step 150 comprises, for each direct subset $\{I(CTI_j, \Theta_{k_E}, t, p)\}_E$, establishing a map showing all of the differences $\tau$ in date of arrival calculated from pulses of said direct subset $\{I(CTI_j, \Theta_{k_E}, t, p)\}_E$, based on directions of arrival $\theta$ of the reflected pulses corresponding to said calculated differences $\tau$ in date of arrival.

Each map thus shows all of the pulses received after reflection on reflectors of the environment and coming from a same source to be located.

Figure 8:
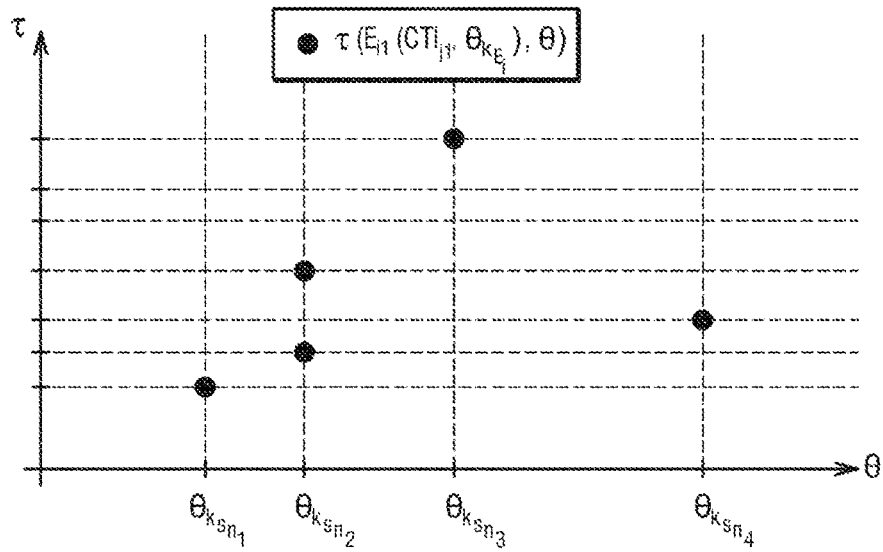

An example map obtained for a direct subset $$\{I(CTI_{j1}, \Theta_{k_{E_i}}, t, p)\}_E$$

of invariant technical characteristic $CTI_{j1}$ and direction of arrival $$\Theta_{k_{E_i}}$$

is shown by FIG. 8. As illustrated on this map, the reflected pulses corresponding to the differences $\tau$ in dates of arrival of the map are in one of the directions of arrival $$\theta_{k_{S_{n_1}}}, \theta_{k_{S_{n_2}}}, \theta_{k_{S_{n_3}}} \text{ or } \theta_{k_{S_{n_4}}}.$$

The determining step 150 next comprises, for each pair made up of two direct subsets $\{I(CTI_j, \Theta_{k_E}, t, p)\}_E$, the pulses of which have different directions of arrival, identifying, from maps established for said direct subsets $\{I(CTI_j, \Theta_{k_E}, t, p)\}_E$, one or several geometric configurations.

Each geometric configuration is chosen from among one of the first, second and third configurations described hereinafter.

The first configuration corresponds to the configuration of FIG. 2. In the first configuration, said pair of direct subsets $\{I(CTI_j, \Theta_{k_E}, t, p)\}_E$ corresponds to two sources to be located, the pulses emitted by said sources being reflected on two reflectors. One of the reflectors is combined with one of said sources and the other reflector is combined with the other of said sources. The first configuration is associated with:

a first delay $$\tau_{m_1}\left(E_{i_1}\left(CTI_{j_1}, \Theta_{k_{E_1}}\right), \Theta_{k_{S_{n_2}}} = \Theta_{k_{E_2}}\right)$$

relative to the reflection of the pulses emitted by a first of said sources on the reflector combined with the other source, and a second delay $$\tau_{m_2}\left(E_{i_2}\left(CTI_{j_2}, \Theta_{k_{E_2}}\right), \Theta_{k_{S_{n_1}}} = \Theta_{k_{E_1}}\right)$$

relative to the reflection of the pulses emitted by a second of said sources on the reflector combined with the other source.

The second configuration corresponds to one of the configurations of FIG. 3 or 4. In the second configuration, said pair of direct subsets $\{I(CTI_j, \Theta_{k_E}, t, p)\}_E$ corresponds to two sources to be located, the pulses emitted by said sources being reflected on two reflectors. One of the reflectors is separate from said sources and one of the reflectors is combined with one of said sources. The second configuration is associated with:

a first delay $$\tau_{m_1}\left(E_{i_1}\left(CTI_{j_1}, \Theta_{k_{E_1}}\right), \Theta_{k_{S_{n_2}}} = \Theta_{k_{E_2}}\right)$$

relative to the reflection of the pulses emitted by a first of said sources on the reflector combined with the other source, a second delay $$\tau_{m_2}\left(E_{i_1}\left(CTI_{j_1}, \Theta_{k_{E_1}}\right), \Theta_{k_{S_{n_1}}} \neq \Theta_{k_{E_1}} \text{ and } \Theta_{k_{S_{n_1}}} \neq \Theta_{k_{E_2}}\right)$$

relative to the reflection of the pulses emitted by the first of said sources on the separate reflector, and a third delay $$\tau_{m_3}\left(E_{i_2}\left(CTI_{j_2}, \Theta_{k_{E_{i_2}}}\right), \Theta_{k_{S_{n_1}}} \neq \Theta_{k_{E_{i_1}}} \text{ and } \Theta_{k_{S_{n_1}}} \neq \Theta_{k_{E_{i_2}}}\right)$$

relative to the reflection of the pulses emitted by a second of said sources on the separate reflector.

The third configuration corresponds to the aforementioned configuration of FIG. 5. In the third configuration, said pair of direct subsets $\{I(CTI_j, \Theta_{k_E}, t, p)\}_E$ corresponds to two sources to be located, the pulses emitted by said sources being reflected on two separate reflectors of said sources. The third configuration is associated with:

a first delay $$\tau_{m_1}\left(E_{i_1}\left(CTI_{j_1}, \Theta_{k_{E_{i_1}}}\right),\right.$$
$$\left. \Theta_{k_{S_{n_1}}} \neq \Theta_{k_{E_{i_1}}} \text{ and } \Theta_{k_{S_{n_1}}} \neq \Theta_{k_{E_{i_2}}} \text{ and } \Theta_{k_{S_{n_1}}} \neq \Theta_{k_{S_{n_2}}}\right)$$

relative to the reflection of the pulses emitted by a first of said sources on a first of said reflectors, a second delay $$\tau_{m_2}\left(E_{i_2}\left(CTI_{j_2}, \Theta_{k_{E_{i_2}}}\right),\right.$$
$$\left. \Theta_{k_{S_{n_1}}} \neq \Theta_{k_{E_{i_1}}} \text{ and } \Theta_{k_{S_{n_1}}} \neq \Theta_{k_{E_{i_2}}} \text{ and } \Theta_{k_{S_{n_1}}} \neq \Theta_{k_{S_{n_2}}}\right)$$

relative to the reflection of the pulses emitted by a second of said sources on the first of said reflectors, and a third delay $$\tau_{m_3}\left(E_{i_1}\left(CTI_{j_1}, \Theta_{k_{E_{i_1}}}\right),\right.$$
$$\left. \Theta_{k_{S_{n_2}}} \neq \Theta_{k_{E_{i_1}}} \text{ and } \Theta_{k_{S_{n_2}}} \neq \Theta_{k_{E_{i_2}}} \text{ and } \Theta_{k_{S_{n_2}}} \neq \Theta_{k_{S_{n_1}}}\right)$$

relative to the reflection of the pulses emitted by the first of said sources on a second of said reflectors, a fourth delay $$\tau_{m_4}\left(E_{i_2}\left(CTI_{j_2}, \Theta_{k_{E_{i_2}}}\right),\right.$$
$$\left. \Theta_{k_{S_{n_2}}} \neq \Theta_{k_{E_{i_1}}} \text{ and } \Theta_{k_{S_{n_2}}} \neq \Theta_{k_{E_{i_2}}} \text{ and } \Theta_{k_{S_{n_2}}} \neq \Theta_{k_{S_{n_1}}}\right)$$

relative to the reflection of the pulses emitted by the second of said sources on the second of said reflectors.

Figure 9:
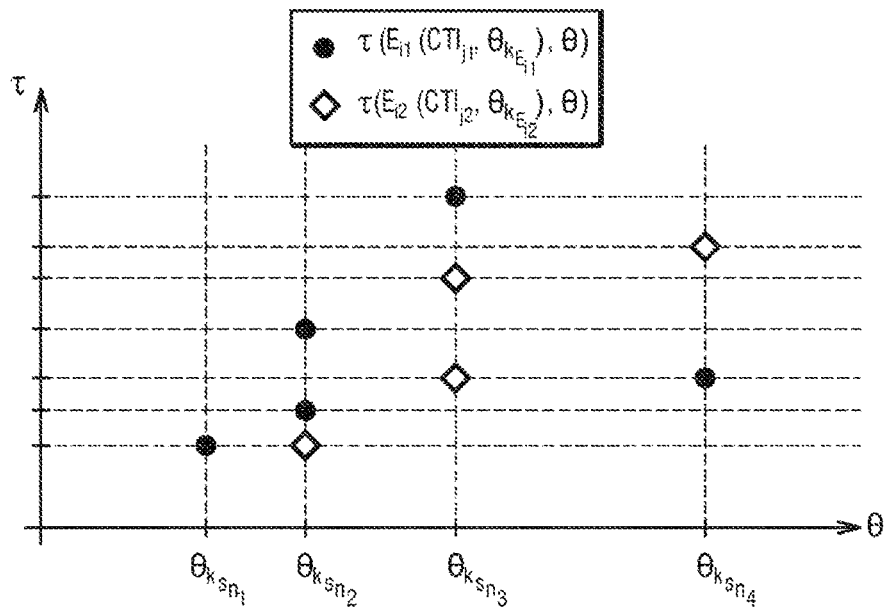

The identification of the geometric configurations for each pair made up of two direct subsets $\{I(CTI_j, \Theta_{k_E}, t, p)\}_E$ is for example obtained by superposition of the maps obtained for said direct subsets $\{I(CTI_j, \Theta_{k_E}, t, p)\}_E$. Such a superposition of two maps is for example illustrated by FIG. 9, where the data from the map of a first source $E_i$ shown by circles and the data from the map of a second source $E_{i_2}$ is shown by diamonds.

The determination step 150 next comprises calculating the distance $RE_i$ from each source $E_i$ to the detector R from expressions (15) and (13) previously described. The determination step 150 further comprises calculating the distance $RS_n$ from each reflector $S_n$ to the detector R from expressions (7.2) and (7.3) previously described.

The intermediate properties are calculated from expressions (1), (2) and (3) previously described.

For the first configuration illustrated in FIG. 2, the two delays are:

$$\tau_{E_{i_1}, S_{n_2}} = \tau_{m_1}\left(E_{i_1}\left(CTI_{j_1}, \Theta_{k_{E_{i_1}}}\right), \Theta_{k_{S_{n_2}}} = \Theta_{k_{E_{i_2}}}\right) \quad (16)$$

$$\tau_{E_{i_2}, S_{n_1}} = \tau_{m_2}\left(E_{i_2}\left(CTI_{j_2}, \Theta_{k_{E_{i_2}}}\right), \Theta_{k_{S_{n_1}}} = \Theta_{k_{E_{i_1}}}\right) \quad (17)$$

and the coefficients $b_{pq}$ making it possible to solve expressions (15) and (13) are given by expressions (12.1) and (12.2) previously described.

For the second configuration illustrated in FIG. 3, the three delays are:

$$\tau_{E_{i_1}, S_{n_2}} = \tau_{m_1}\left(E_{i_1}\left(CTI_{j_1}, \Theta_{k_{E_{i_1}}}\right), \Theta_{k_{S_{n_2}}} = \Theta_{k_{E_{i_2}}}\right) \quad (18)$$

$$\tau_{E_{i_1}, S_{n_1}} = \tau_{m_2}\left(E_{i_1}\left(CTI_{j_1}, \Theta_{k_{E_{i_1}}}\right), \Theta_{k_{S_{n_1}}} \neq \Theta_{k_{E_{i_1}}} \text{ and } \Theta_{k_{S_{n_1}}} \neq \Theta_{k_{E_{i_2}}}\right) \quad (19)$$

$$\tau_{E_{i_2}, S_{n_1}} = \tau_{m_3}\left(E_{i_2}\left(CTI_{j_2}, \Theta_{k_{E_{i_2}}}\right), \Theta_{k_{S_{n_1}}} \neq \Theta_{k_{E_{i_1}}} \text{ and } \Theta_{k_{S_{n_1}}} \neq \Theta_{k_{E_{i_2}}}\right) \quad (20)$$

and the coefficients $b_{pq}$ making it possible to solve expressions (15) and (13) are given by expressions (12.3) and (12.2) previously described.

For the second configuration illustrated in FIG. 4, the three delays are:

$$\tau_{E_{i_1}, S_{n_2}} = \quad (21)$$
$$\tau_{m_1}\left(E_{i_1}\left(CTI_{j_1}, \Theta_{k_{E_{i_1}}}\right), \Theta_{k_{S_{n_2}}} \neq \Theta_{k_{E_{i_1}}} \text{ and } \Theta_{k_{S_{n_2}}} \neq \Theta_{k_{E_{i_2}}}\right)$$

$$\tau_{E_{i_2}, S_{n_2}} = \tau_{m_2}\left(E_{i_2}\left(CTI_{j_2}, \Theta_{k_{E_{i_2}}}\right), \Theta_{k_{S_{n_2}}} \neq \Theta_{k_{E_{i_1}}} \text{ and } \Theta_{k_{S_{n_2}}} \neq \Theta_{k_{E_{i_2}}}\right) \quad (22)$$

$$\tau_{E_{i_2}, S_{n_1}} = \tau_{m_3}\left(E_{i_2}\left(CTI_{j_2}, \Theta_{k_{E_{i_2}}}\right), \Theta_{k_{S_{n_1}}} = \Theta_{k_{E_{i_1}}}\right) \quad (23)$$

and the coefficients $b_{pq}$ making it possible to solve expressions (15) and (13) are given by expressions (12.1) and (12.4) previously described.

For the third configuration illustrated in FIG. 5, the four delays are:

$$\tau_{E_{i_1}, S_{n_1}} = \tau_{m_1}\left(E_{i_1}\left(CTI_{j_1}, \Theta_{k_{E_{i_1}}}\right),\right. \quad (24)$$
$$\left. \Theta_{k_{S_{n_1}}} \neq \Theta_{k_{E_{i_1}}} \text{ and } \Theta_{k_{S_{n_1}}} \neq \Theta_{k_{E_{i_2}}} \text{ and } \Theta_{k_{S_{n_1}}} \neq \Theta_{k_{S_{n_2}}}\right)$$

$$\tau_{E_{i_2}, S_{n_1}} = \tau_{m_2}\left(E_{i_2}\left(CTI_{j_2}, \Theta_{k_{E_{i_2}}}\right),\right. \quad (25)$$
$$\left. \Theta_{k_{S_{n_1}}} \neq \Theta_{k_{E_{i_1}}} \text{ and } \Theta_{k_{S_{n_1}}} \neq \Theta_{k_{E_{i_2}}} \text{ and } \Theta_{k_{S_{n_1}}} \neq \Theta_{k_{S_{n_2}}}\right)$$

$$\tau_{E_{i_1}, S_{n_2}} = \tau_{m_3}\left(E_{i_1}\left(CTI_{j_1}, \Theta_{k_{E_{i_1}}}\right),\right. \quad (26)$$
$$\left. \Theta_{k_{S_{n_2}}} \neq \Theta_{k_{E_{i_1}}} \text{ and } \Theta_{k_{S_{n_2}}} \neq \Theta_{k_{E_{i_2}}} \text{ and } \Theta_{k_{S_{n_2}}} \neq \Theta_{k_{S_{n_1}}}\right)$$

-continued $$\tau_{E_{i_2},S_{n_2}} = \tau_{m_4}\left(E_{i_2}\left(CTI_{j_2}, \Theta_{k_{E_{i_2}}}\right), \quad (27)$$

$$\Theta_{k_{S_{n_2}}} \neq \Theta_{k_{E_{i_1}}} \text{ and } \Theta_{k_{S_{n_2}}} \neq \Theta_{k_{E_{i_2}}} \text{ and } \Theta_{k_{S_{n_2}}} \neq \Theta_{k_{S_{n_1}}}\right)$$

and the coefficients $b_{pq}$ making it possible to solve expressions (15) and (13) are given by expressions (12.3) and (12.4) previously described.

Thus for each given configuration, four distances $RE_{i_1}$, $RE_{i_2}$, $RS_{n_1}$ and $RS_{n_2}$ are obtained, respectively associated with the directions of arrival $$\Theta_{k_{E_{i_1}}}, \Theta_{k_{E_{i_2}}}, \Theta_{k_{S_{n_1}}} \text{ and } \Theta_{k_{S_{n_2}}}.$$

Among all of the considered configurations, some do not correspond to reality. Such combinations have a high likelihood of yielding abnormal results. As a result, the determination step 150 preferably comprises the elimination of implausible distance values $RE_{i_1}$, $RE_{i_2}$, $RS_{n_1}$, and $RS_{n_2}$. A distance is said to be plausible if it is comprised in a plausible distance interval. The distances of each plausible distance interval are strictly positive. A plausible distance interval is for example defined for the sources: $[RE_{min}, RE_{max}]$ and a different plausible distance interval for the reflectors: $[RS_{min}, RS_{max}]$.

Alternatively, plausible distance intervals are defined specific to each source and to each reflection direction.

If at least one pair of direct subsets exists associated with at least one configuration, each configuration making it possible to obtain four distances $RE_{i_1}$, $RE_{i_2}$, $RS_{n_1}$ and $RS_{n_2}$, this implies that several solutions can be obtained for a same distance. As a result, the determination step 150 also comprises the choice of the most frequently occurring distance from among the distance value(s) obtained for each source. Such a choice is for example made from a statistical distribution, such as a histogram, of all of the obtained distance values.

For the reflectors, given that several reflectors may be located in a same direction, the choice of the most frequent distance from among all of the obtained distance values is preferably not made. Therefore, the determination step 150 preferably comprises establishing the statistical distribution, preferably in histogram form, of all of the obtained distance values. To integrate the angular errors, such a histogram is for example a histogram with two distance-direction of arrival dimensions, thus having a map of the reflectors.

The described method therefore makes it possible to locate sources $E_i$ from a single quasi-static detector relative to the sources to be located. Such a method also allows the localization of reflectors $S_n$ located in the environment of the sources to be $E_i$ located.

More specifically, such a method makes it possible to locate two sources in an environment comprising at least said sources and two reflectors irrespective of the configuration of the sources and reflectors under the hypothesis that the reflectors are not co-located relative to one another and the sources are not co-located relative to one another, or aligned with the detector.

The method proposes to solve a single system of equations for all possible configurations with coefficients specific to each of said configurations.

The location of the sources is based solely on measurements of directions of arrival and dates of arrival of the radar pulses coming directly from emitters and indirectly from the latter via reflections on reflective physical objects of the environment.

The identification 120, regrouping 130, calculation 140 and determination 150 steps make it possible to consider all of the possible configurations of sources and reflectors, which makes it possible to improve the precision of the localization of the sources $E_i$.

While there have been shown and described and pointed out the fundamental novel features of the invention as applied to certain inventive embodiments, it will be understood that the foregoing is considered as illustrative only of the principles of the invention and not intended to be exhaustive or to limit the invention to the precise forms disclosed. Modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplate. All such modifications and variations are within the scope of the invention as determined by the appended claims when interpreted in accordance with the breadth to which they are entitled.

What is claimed is:

1. A method for locating at least two electromagnetic pulse emission sources in an environment, the environment comprising at least two reflectors, the method comprising:
   receiving, by a detector, for each source to be located, at least one same emitted pulse, received on the one hand directly from the source and received on the other hand by reflection on one of the reflectors,
   measuring a arrival direction, a date of arrival, a power and at least one invariant technical characteristic of each received pulse,
   identifying direct subsets and reflected subsets, each direct subset comprising pulses received directly from a same source to be located, each reflected subset comprising pulses emitted by a same source to be located and received after reflection on a same reflector,
   grouping by pairs of direct subsets with reflected subsets, the pulses of the subsets of each pair having the same invariant technical characteristics,
   calculating, for each pair, differences in dates of arrival between the pulses of the reflected subset and the pulses of the direct subset of the pair,
   determining a distance of each source from the detector from calculated differences in dates of arrival of the pulses of each pair, and
   determining the location of each source based on the arrival directions and the distance corresponding to the source as determined by the grouping,
   wherein the identifying comprises:
      regrouping received pulses with same invariant technical characteristics and same directions of arrival into subsets,
      determining a maximum power of the pulses of each subset and a number of pulses of each subset,
      for each subset, when a first condition is met, then the subset comprises pulses received directly, the first condition stipulating that the maximum power determined for the subset is greater than or equal to a first predetermined power threshold and the number of pulses determined for the subset is equal to a maximum number of pulses from among the number of pulses of the subsets with same invariant technical characteristics as the subset irrespective of the direction of arrival of the subsets, and for each subset, when a second condition is met, then the pulses of the subset are identified as received reflected, the second condition stipulating that the maximum power determined for the subset is strictly less than a second predetermined power threshold and the number of pulses determined for the subset is strictly less than the maximum number of pulses from among the number of pulses of the subsets with same invariant technical characteristics as the subset irrespective of the direction of arrival of the subsets.

2. The method according to claim 1, wherein, for each subset, when the first condition is met, the identifying further comprises:

establishing a first statistical distribution of deviations between successive dates of arrival of the pulses of the subset, having a power greater than or equal to half the maximum power, and establishing a second statistical distribution of deviations between the successive dates of arrival of the pulses of the subset, when the second statistical distribution is identical to the first statistical distribution, then the pulses of the subset are identified as received directly and the subset is a direct subset, when the second statistical distribution comprises deviations different from the deviations of the first statistical distribution and less than or equal to a third predetermined threshold, then the pulses from which the different deviations are derived are identified as being received reflected and form a reflected subset and the remaining pulses of the subset are identified as being received directly and form a direct subset.

3. The method according to claim 1, wherein the determining of the distance comprises, for each direct subset, establishing a map showing all of the differences in date of arrival calculated from pulses of the direct subset, based on directions of arrival of the reflected pulses corresponding to the calculated differences in date of arrival, the distance from each source to the detector being determined based on the map established for each direct subset.

4. The method according to claim 3, wherein for each pair made up of two direct subsets, the pulses of which have different directions of arrival and different invariant technical characteristics, the determination further comprises identifying, from the maps established for the direct subsets, one or several geometric configurations, each geometric configuration being chosen from among the following configurations:

a first configuration in which the pair of direct subsets corresponds to two sources to be located, the pulses emitted by the sources being reflected on two reflectors, one of the reflectors being combined with one of the sources and the other reflector being combined with the other of the sources, the first configuration being associated with: a first delay relative to the reflection of the pulses emitted by a first of the sources on the reflector combined with the other source and a second delay relative to the reflection of the pulses emitted by a second of the sources on the reflector combined with the other source, a second configuration in which the pair of direct subsets corresponds to two sources to be located, the pulses emitted by the sources being reflected on two reflectors, one of the reflectors being combined with one of the sources and the other of the reflectors being separate from the sources, the second configuration being associated with: a first delay relative to the reflection of the pulses emitted by a first of the sources on the reflector combined with the other source, a second delay relative to the reflection of the emitted pulses by the first of the sources on the separate reflector, and a third delay relative to the reflection of the pulses emitted by a second of the sources on the separate reflector, and a third configuration in which the pair of direct subsets corresponds to two sources to be located, the pulses emitted by the sources being reflected on two reflectors separate from the sources, the third configuration being associated with: a first delay relative to the reflection of the pulses emitted by a first of the sources on a first of the reflectors, a second delay relative to the reflection of the pulses emitted by a second of the sources on the first of the reflectors, a third delay relative to the reflection of the pulses emitted by the first of the sources on a second of the reflectors, and a fourth delay relative to the reflection of the pulses emitted by the second of the sources on the second of the reflectors, the distance from each source to the detector being determined based on the delays associated with each determined configuration and the directions of arrival of the pulses corresponding to the delays.

5. The method according to claim 4, wherein each configuration makes it possible to determine the respective distances of two of the sources to be located from the detector, the distances being calculated:

for each first configuration from the following equations:

$$\begin{cases} RE_{i_1} = \dfrac{\Delta_{E_{i_2}, s_{n_1}^2} + 2\Delta_{E_{i_2}, s_{n_1}} \cdot RE_{i_2}}{2\Delta_{E_{i_2}, s_{n_1}} + 2(1 - \cos(\alpha_{E_{i_2}, s_{n_1}})) \cdot RE_{i_2}} \\ RE_{i_2} = \dfrac{\Delta_{E_{i_1}, s_{n_2}^2} + 2\Delta_{E_{i_1}, s_{n_2}} \cdot RE_{i_1}}{2\Delta_{E_{i_1}, s_{n_2}} + 2(1 - \cos(\alpha_{E_{i_1}, s_{n_2}})) \cdot RE_{i_1}} \end{cases}$$

for each second configuration from the following equations:

$$\begin{cases} \dfrac{\Delta_{E_{i_1}, s_{n_1}^2} + 2\Delta_{E_{i_1}, s_{n_1}} \cdot RE_{i_1}}{2\Delta_{E_{i_1}, s_{n_1}} + 2(1 - \cos(\alpha_{E_{i_1}, s_{n_1}})) \cdot RE_{i_1}} = \dfrac{\Delta_{E_{i_2}, s_{n_1}^2} + 2\Delta_{E_{i_2}, s_{n_1}} \cdot RE_{i_2}}{2\Delta_{E_{i_2}, s_{n_1}} + 2(1 - \cos(\alpha_{E_{i_2}, s_{n_1}})) \cdot RE_{i_2}} \\ RE_{i_2} = \dfrac{\Delta_{E_{i_1}, s_{n_2}^2} + 2\Delta_{E_{i_1}, s_{n_2}} \cdot RE_{i_1}}{2\Delta_{E_{i_1}, s_{n_2}} + 2(1 - \cos(\alpha_{E_{i_1}, s_{n_2}})) \cdot RE_{i_1}} \end{cases}$$

or $$\begin{cases} RE_{i_1} = \dfrac{\Delta_{E_{i_2}, s_{n_1}^2} + 2\Delta_{E_{i_2}, s_{n_1}} \cdot RE_{i_2}}{2\Delta_{E_{i_2}, s_{n_1}} + 2(1 - \cos(\alpha_{E_{i_2}, s_{n_1}})) \cdot RE_{i_2}} \\ \dfrac{\Delta_{E_{i_1}, s_{n_2}^2} + 2\Delta_{E_{i_1}, s_{n_2}} \cdot RE_{i_1}}{2\Delta_{E_{i_1}, s_{n_2}} + 2(1 - \cos(\alpha_{E_{i_1}, s_{n_2}})) \cdot RE_{i_1}} = \dfrac{\Delta_{E_{i_2}, s_{n_2}^2} + 2\Delta_{E_{i_2}, s_{n_2}} \cdot RE_{i_2}}{2\Delta_{E_{i_2}, s_{n_2}} + 2(1 - \cos(\alpha_{E_{i_2}, s_{n_2}})) \cdot RE_{i_2}} \end{cases}$$

for each third configuration from the following equations:

$$\begin{cases} \dfrac{\Delta_{E_{i_1},s_{n_2}^2} + 2\Delta_{E_{i_1},s_{n_2}} \cdot RE_{i_1}}{2\Delta_{E_{i_1},s_{n_2}} + 2(1-\cos(\alpha_{E_{i_1},s_{n_2}})) \cdot RE_{i_1}} = \dfrac{\Delta_{E_{i_2},s_{n_1}^2} + 2\Delta_{E_{i_2},s_{n_1}} \cdot RE_{i_2}}{2\Delta_{E_{i_2},s_{n_1}} + 2(1-\cos(\alpha_{E_{i_2},s_{n_1}})) \cdot RE_{i_2}} \\ \dfrac{\Delta_{E_{i_1},s_{n_2}^2} + 2\Delta_{E_{i_1},s_{n_2}} \cdot RE_{i_1}}{2\Delta_{E_{i_1},s_{n_2}} + 2(1-\cos(\alpha_{E_{i_1},s_{n_2}})) \cdot RE_{i_1}} = \dfrac{\Delta_{E_{i_2},s_{n_2}^2} + 2\Delta_{E_{i_2},s_{n_2}} \cdot RE_{i_2}}{2\Delta_{E_{i_2},s_{n_2}} + 2(1-\cos(\alpha_{E_{i_2},s_{n_2}})) \cdot RE_{i_2}} \end{cases}$$

where $$\Delta_{E_{i_1},s_{n_1}} = c \cdot \tau_{E_{i1},s_{n1}}, \Delta_{E_{i_2},s_{n_2}} = c \cdot \tau_{E_{i2},s_{n2}},$$

$$\Delta_{E_{i_2},s_{n_1}} = c \cdot \tau_{E_{i2},s_{n1}}, \Delta_{E_{i_1},s_{n_2}} = c \cdot \tau_{E_{i1},s_{n2}},$$

$RE_{i_1}$ is the distance from the first source to the detector,
$RE_{i_2}$ is the distance from the second source to the detector,
c is the propagation speed of the electromagnetic waves,
$\tau_{E_{i1},s_{n1}}$ the difference in date of arrival among the pulses received by reflection on a first reflector relative to the pulses received directly from the first source,
$\tau_{E_{i2},s_{n2}}$ is the difference in date of arrival among the pulses received reflected on a second reflector relative to the pulses received directly from the second source,
$\tau_{E_{i2},s_{n1}}$ is the difference in date of arrival among the pulses received reflected on the first reflector relative to the pulses received directly from the second source,
$\tau_{E_{i1},s_{n2}}$ is the difference in date of arrival among the pulses received reflected on the second reflector relative to the pulses received directly from the first source, $\alpha_{E_{i_2},s_{n_2}}$ is the angular deviation between the second source and the second reflector seen from the detector, $\alpha_{E_{i_1},s_{n_1}}$ is the angular deviation between the first source and the first reflector seen from the detector, $\alpha_{E_{i_2},s_{n_1}}$ is the angular deviation between the second source and the first reflector seen from the detector, and $\alpha_{E_{i_1},s_{n_2}}$ is the angular deviation between the second source and the first reflector seen from the detector.

6. The method according to claim 4, wherein the configuration(s) identified for each pair of direct subsets make it possible to obtain at least one distance from each source to the detector, the distance determined for each source being the most frequently occurring distance from among the distance value(s) obtained for the source.

7. The method according to claim 4, wherein the configuration(s) identified for each pair of direct subsets also make it possible to obtain at least one distance from each reflector to the detector.

8. The method according to claim 1, wherein the calculating differences in date of arrival for each pair comprises eliminating differences in date of arrival strictly above a fourth predetermined threshold and for which the number of occurrences is greater than or equal to a fifth predetermined threshold.

9. The method according to claim 1, wherein the invariant characteristics of each pulse comprise at least one of the features from among: the width of the pulse, the carrier frequency of the pulse and the intentional intra-pulse modulation.

10. A detector for locating at least two electromagnetic pulse emission sources in an environment, the environment comprising at least two reflectors, the detector being configured to carry out the method according to claim 1.

11. The method according to claim 1, wherein the pulses are emitted and received by a radar system.

12. The method according to claim 11, wherein the reflectors are reflective of radio frequency electromagnetic signals.

* * * * *